(12) United States Patent
Adler et al.

(10) Patent No.: US 8,117,533 B2
(45) Date of Patent: Feb. 14, 2012

(54) METHOD AND SYSTEM FOR STYLESHEET RULE CREATION, COMBINATION, AND REMOVAL

(75) Inventors: Sharon C. Adler, East Greenwich, RI (US); Anders L R Berglund, East Greenwich, RI (US); Donald Jon Boulia, Apex, NC (US); Thomas Joseph Brawn, Apex, NC (US); D. Kirk Grotjohn, Cary, NC (US); Kristoffer H. Rose, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 2535 days.

(21) Appl. No.: 10/095,797

(22) Filed: Mar. 12, 2002

(65) Prior Publication Data

US 2004/0205605 A1    Oct. 14, 2004

(51) Int. Cl.
*G06F 17/00*    (2006.01)
(52) U.S. Cl. ........................................ 715/234; 715/236
(58) Field of Classification Search .................. 715/523, 715/513, 234–237; 709/231, 102; 707/100, 707/102, 513, 2
See application file for complete search history.

(56) References Cited

U.S. PATENT DOCUMENTS

| | | | |
|---|---|---|---|
| 5,926,806 A | 7/1999 | Marshall et al. | 707/3 |
| 6,279,015 B1* | 8/2001 | Fong et al. | 715/523 |
| 6,502,112 B1 | 12/2002 | Baisley | |
| 6,643,652 B2 | 11/2003 | Helgeson et al. | 701/10 |
| 6,772,165 B2* | 8/2004 | O'Carroll | 707/101 |
| 6,845,380 B2 | 1/2005 | Su et al. | |
| 2001/0018696 A1* | 8/2001 | Hori et al. | 707/513 |
| 2001/0032218 A1 | 10/2001 | Huang | |

FOREIGN PATENT DOCUMENTS

WO     WO9414122      6/1994

OTHER PUBLICATIONS alphaWorks: XML Diff and Merge Tool: FAQs, Jan. 15, 1999, IBM (available at <"http://www.alphaworks.ibm.com/tech/xmldiffmerge">.*
Donald M. Leslie, Transforming documentation from the XML docutypes used for the apache website to DITA, Oct 21, 2001, ACM Press, pp. 157-164.*
Oliver Becker, [xsl] merging XML documents <eom>, Jan 31, 2001, available at <http://www.xslt.com/html/xsl-list/2001-01/msg0153.html>, pp. 1-2 (see screenshots).*
Pietriga, "VXT: A Visual Approach to XML Transformations", ACM Press, 2001, pp. 1-10.
Villard, "Authoring Transformations by Direct Manipulation for Adaptable Multimedia Presentations", ACM Press, 2001, pp. 125-134.

* cited by examiner

*Primary Examiner* — Quoc A Tran
(74) *Attorney, Agent, or Firm* — Steven M. Greenberg, Esq.; Carey, Rodriguez, Greenberg & O'Keefe (57) ABSTRACT

A method (and system) for editing rules contained in a first document, where the rules define a transformation of data on a second document and where the first document and second document have elements constructed in a tree structure having nodes, each rule having a template structure including at least one match condition, the match condition being an expression in the template that describes a subset of tree nodes, includes selecting at least one rule in the first document and checking a match condition of the user-selected rule with the tree nodes from the second document to determine which structures in the second document match the selected rule.

16 Claims, 5 Drawing Sheets

```
<?xml version="1.0"?>
            <flight-list>
40 ---------- <flight>
              <number>742</number>
              <leg-list>
               <leg>
43 ------------  <dep><city code="PVD">Providence</city><time>9:24</time></dep>
                 <arr><city code="ORD">Chicago</city><time>10:38</time></arr>
                 <remark>Short transfer time.</remark>
               </leg>
               <leg>
                 <dep><city code="ORD">Chicago</city><time>11:14</time></dep>
                 <arr><city code="SJC">San Jose</city><time>12:32</time></arr>
               </leg>
              </leg-list>
             </flight>
             <flight>
45 ---------  <number>875</number>
              <leg-list>
               <leg>
42, 44 ---------  <dep><city code="NRT">Tokyo</city><time>16:55</time></dep>
                  <arr><city code="BKK">Bangkok</city><time>21:30</time></arr>
               </leg>
              </leg-list>
             </flight>
41 --------- <flight>
              <number>904</number>
              <leg-list>
               <leg>
                 <dep><city code="JFK">New York</city><time>20:45</time></dep>
                 <arr><city code="LHR">London</city><time>08:55</time></arr>
               </leg>
              </leg-list>
             </flight>
             <flight>
              <number>979</number>
              <leg-list>
               <leg>
                 <dep><city code="LHR">London</city><time>18:00</time></dep>
                 <arr><city code="JFK">New York</city><time>20:50</time></arr>
               </leg>
              </leg-list>
             </flight>
            </flight-list>
```

(SAMPLE XML SOURCE DOCUMENT)

FIGURE 4

```xml
<?xml version="1.0" encoding="utf-8"?>
<xsl:stylesheet
 xmlns="http://www.w3.org/1999/xhtml"
 xmlns:xsl="http://www.w3.org/1999/XSL/Transform"
 version="1.0">

<xsl:template match="/">
   <html>
    <head>
      <title>Flights</title>
    </head>
    <body>
     <p>
      <xsl:text>Flights: </xsl:text>  ------------------------------------------------  51
      <xsl:for-each select="flight-list/flight">
        <xsl:apply-templates select="number"/>
        <xsl:choose>
          <xsl:when test="following-sibling::flight"><xsl:text>,</xsl:text></xsl:when>
          <xsl:otherwise><xsl:text>.</xsl:text></xsl:otherwise>
        </xsl:choose>
      </xsl:for-each>
     </p>

<xsl:apply-templates/>
    </body>
   </html>
  </xsl:template>

<xsl:template match="*"> ----------------------------------------------------------------- 50
    <xsl:apply-templates/>
   </xsl:template>
</xsl:stylesheet>
```

METHOD AND SYSTEM FOR STYLESHEET RULE CREATION, COMBINATION, AND REMOVAL

CROSS-REFERENCE TO RELATED APPLICATIONS

The present Application is related to the following co-pending applications:

U.S. patent application Ser. No. 10/095,827, filed on Mar. 13, 2002, to Adler et al., entitled "METHOD AND SYSTEM FOR STYLESHEET-CENTRIC EDITING";

U.S. patent application Ser. No. 10/095,737, filed on Mar. 12, 2002, to Rose, K. H., entitled "METHOD AND SYSTEM FOR COPY AND PASTE TECHNOLOGY FOR STYLESHEET EDITING"; and U.S. patent application Ser. No. 10/096,379, filed on Mar. 12, 2002, to Clarke et al., entitled "METHOD AND SYSTEM STYLESHEET EXECUTION INTERACTIVE FEEDBACK", all assigned to the present assignee, and all incorporated herein by reference.

BACKGROUND OF THE INVENTION

1. Field of the Invention

The present invention relates generally to a method of editing rules in a template-based tree-structure environment. In an exemplary embodiment, the present invention is incorporated in an XSLT (eXtensible Style Language Transformations) stylesheet editor to automatically propose options for XSLT stylesheet rule modifications as based on selections by a user of stylesheet rules and eXtensible Mark-up Language (XML) source elements.

2. Description of the Related Art

FIG. 1 shows an overview of a conventional method of editing an XSLT stylesheet. XSLT stylesheet 10 includes a set of rules that describe how to process elements of an input XML document 11 to transform these elements into XML output document 12. The actual transformation is executed by transformation engine 13 which is typically an XML application that often additionally includes an XML parser (see FIG. 2 for parser 14). Each rule of the stylesheet 10 matches one or more elements in the input document and describes the actions to take and the output to produce when a matching element is found.

An XSLT stylesheet transforms "source XML" to "result XML". The structure and content of the result are determined by the source as interpreted, sampled, or elaborated by the stylesheet.

```
Source-1 + Stylesheet ==> Result-1
Source-2 + Stylesheet ==> Result-2
```

An XML document contains elements, attributes, and text. A stylesheet contains rules. Rules match elements, attributes, and/or text in the source. When a rule matches, it executes in context of the matched source. It produces some result XML influenced by that context.

XML may be represented as a "tree" of "nodes." Each node of the tree is an element or text. The node at the top of the tree is the "root." All of the nodes connected to the root are the "children" of the root, which is their "parent."

An XSLT stylesheet is itself written as XML. Each rule in the stylesheet is a node in a tree.

Each rule is applicable whenever processing reaches an input XML node that matches its "match condition". Default rules are defined by the environment such that all nodes are matched. Match conditions of XSLT are expressed in the W3C XPath standard language.

An XSLT stylesheet program expresses directly how an input XML document is transformed into an output XML document for presentation or further processing. The major task in developing XSLT stylesheets is structuring the stylesheet into rules that fit the input data to be processed.

Thus, an XSLT stylesheet expresses the transformation rules for converting source XML into a result XML for presentation or further processing. Execution of an XSLT stylesheet is non-sequential. It is not like a program written in conventional programming languages such as C, C++, Java, Basic, FORTRAN, Cobol, etc. This makes the development of XSLT stylesheets very different from development of XML processing programs in conventional programming languages such as C, C++, Java, or Visual Basic. It has a very different execution paradigm than that of these sequential-based structures to which they are accustomed. This means that tools for understanding execution of an XSLT stylesheet can be very different than similar tools for sequential programming languages, such as "debuggers."

When developing an XSLT stylesheet, users need to take the following issues into consideration: What input structure should my new rule match? How do I ensure that the rule I am creating is applied to just the nodes I want? If I create a new rule will it prevent an existing rule that I still want applied from being applied? How do I ensure that I do not end up with many redundant rules?

These issues make stylesheet development tedious. The editors of the convention methods fail to provide adequate assistance in developing new rules of an XSLT stylesheet.

SUMMARY OF THE INVENTION

In view of the foregoing problems, drawbacks, and disadvantages of the conventional systems, it is an object of the present invention, as exemplarily embodied in an XSLT editor, to provide a structure (and method) assisting in the process of developing rules in an XSLT stylesheet.

It is another object of the present invention to teach a method that automatically proposes modifications to an underlying document containing a set of rules defining an input/output transformation, as based on a user's manipulations of a stylized representation of the transformation environment.

It is another object of the present invention to teach a method in which a user can quickly and correctly develop new transformation rules in a template-based, tree-structure environment such as XML.

It is another object of the present invention to teach an exemplary embodiment of this rule creation method as an incorporated feature of an XSLT stylesheet editor.

To achieve the above objectives and goals, the present invention combines the structure of a number of "sample" XML input documents with the present rules of the XSLT stylesheet undergoing development to automatically propose appropriate additions and eliminations to the set of rules. New rules are created by refinement and old rules are combined with merging.

An advantage of this approach is that users can use a simple and direct feedback-driven procedure to develop a rule structure for their XSLT stylesheet which has only rules that are relevant to the way the stylesheet is deployed.

By automatically proposing stylesheet rule modifications, the present invention provides a useful additional feature to a basic XSLT stylesheet editor. Although the present invention was developed specifically for the XSLT editing environment, there is no intent to confine its applicability thereto. It can be used on any "template-based" language for processing structured data such as XML.

In accordance with a first aspect of the present invention, described herein is a method of editing rules contained in a first document, where the rules define a transformation of data on a second document and where the first document and second document have elements constructed in a tree structure having nodes and a template structure, where each rule includes at least one match condition, the match condition being an expression in the template that describes a subset of tree nodes. The method includes receiving an input from a user representing a selection of at least one rule in the first document and checking a match condition of the user-selected rule with the tree nodes from the second document to determine which structures in the second document can match the selected rule.

In accordance with a second aspect of the present invention, also described herein is a structure and a signal-bearing medium tangibly embodying a program of machine-readable instructions executable by a digital processing apparatus to perform the method.

BRIEF DESCRIPTION OF THE DRAWINGS

The foregoing and other objects, aspects and advantages will be better understood from the following detailed description of a preferred embodiment of the invention with reference to the drawings, in which:

FIG. 1 shows an overview of XML transformation using an XSL stylesheet and the conventional XSL editing process;

FIG. 2 shows an overview of a basic XSL editor into which the present invention is exemplarily incorporated;

FIG. 3 is a flowchart of an exemplary embodiment of the present invention as exemplarily embodied in an XSLT editor;

FIG. 4 shows a sample exemplary XML source document for the examples discussed below that demonstrate a practical example of the exemplary embodiment;

FIG. 5 show a sample exemplary XSLT stylesheet being edited in the examples discussed;

FIG. 6 illustrates an exemplary hardware/information handling system 600 for incorporating the present invention therein; and FIG. 7 illustrates a signal bearing medium 700 (e.g., storage medium) for storing steps of a program of a method according to the present invention.

DETAILED DESCRIPTION OF A PREFERRED EMBODIMENT OF THE INVENTION

Figure 1:
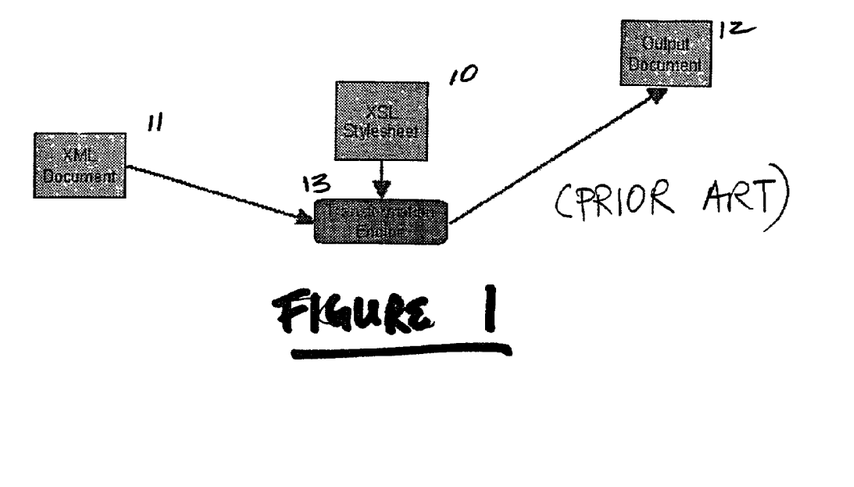

Referring now to the drawings, an exemplary embodiment of the present invention will now be described. First, as a basis for clear comparison and returning to the prior art shown in FIG. 1, a conventional paradigm for editing an XSLT stylesheet typically includes having the user make changes directly to the text in a file containing the XSL stylesheet. The user would then confirm any such changes by executing the transformation defined by the stylesheet, using an XML input 11 and transformation engine 13, and viewing the resultant output XML 12. Creating or changing the rules in an XSLT stylesheet is difficult and complex because of the need for the user to understand the relationship between the input document, the stylesheet rules and the output document.

A new XSLT editor, as disclosed herein and the copending applications listed above, provides a new way of looking at editing an XSTL stylesheet and provides a better understanding of the relationship between the input document 11, the stylesheet rules 10, and the output document 12.

Figure 2:
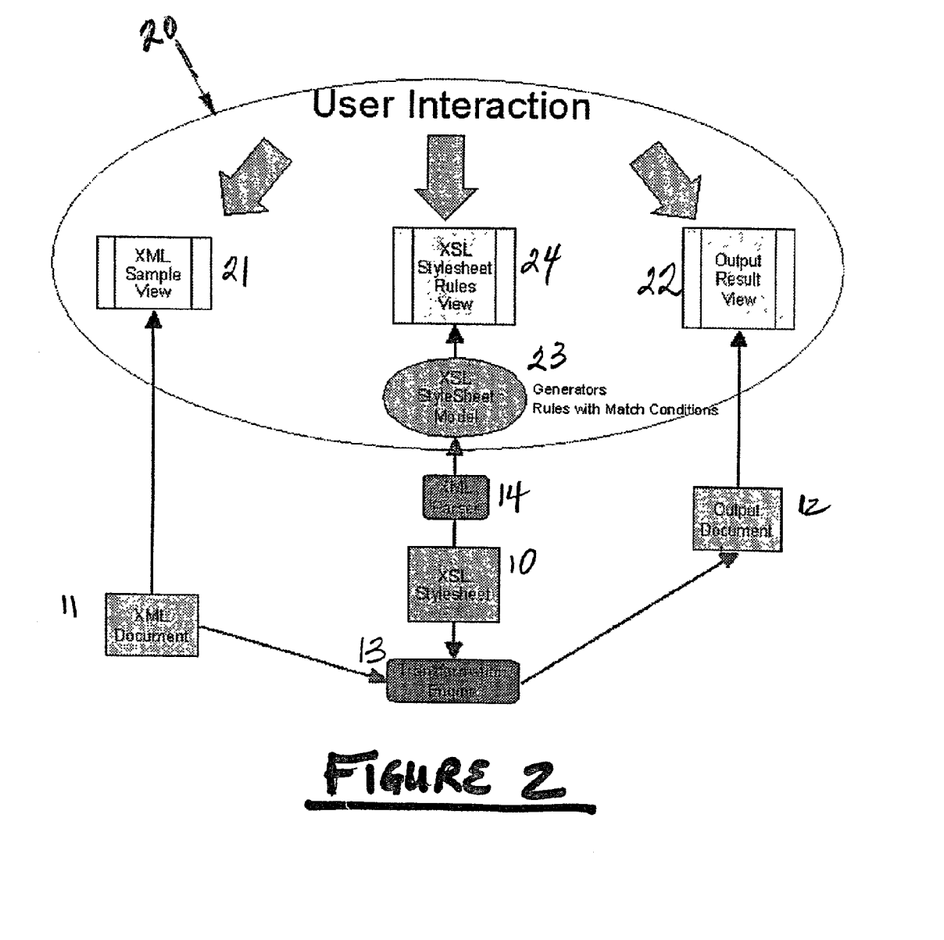

More specifically, as shown in FIG. 2, this new editor 20 comprises a stylesheet centric XSL editor 20 in which a user interacts with a GUI that includes a WYSIWYG ("what you see is what you get") output result view 22 of the output document 12 as executed by transformation engine 13. The user also can view a sample view 21 of the input XML source 11. The editor 20 includes a model 23, which is a logical construct of the underlying XSL stylesheet 10.

Unlike the conventional paradigm for editing XSL stylesheets, the user of this new editor 20 does not have to modify directly the text of the stylesheet file. Instead, the user interacts with the stylesheet through stylized GUI representations 21, 22, 24 of the underlying XML documents and the model 23, using a variety of techniques including the technique discussed herein. This overview of the XSLT stylesheet editing process offers a dramatic improvement over the conventional editing paradigm.

Figure 3:
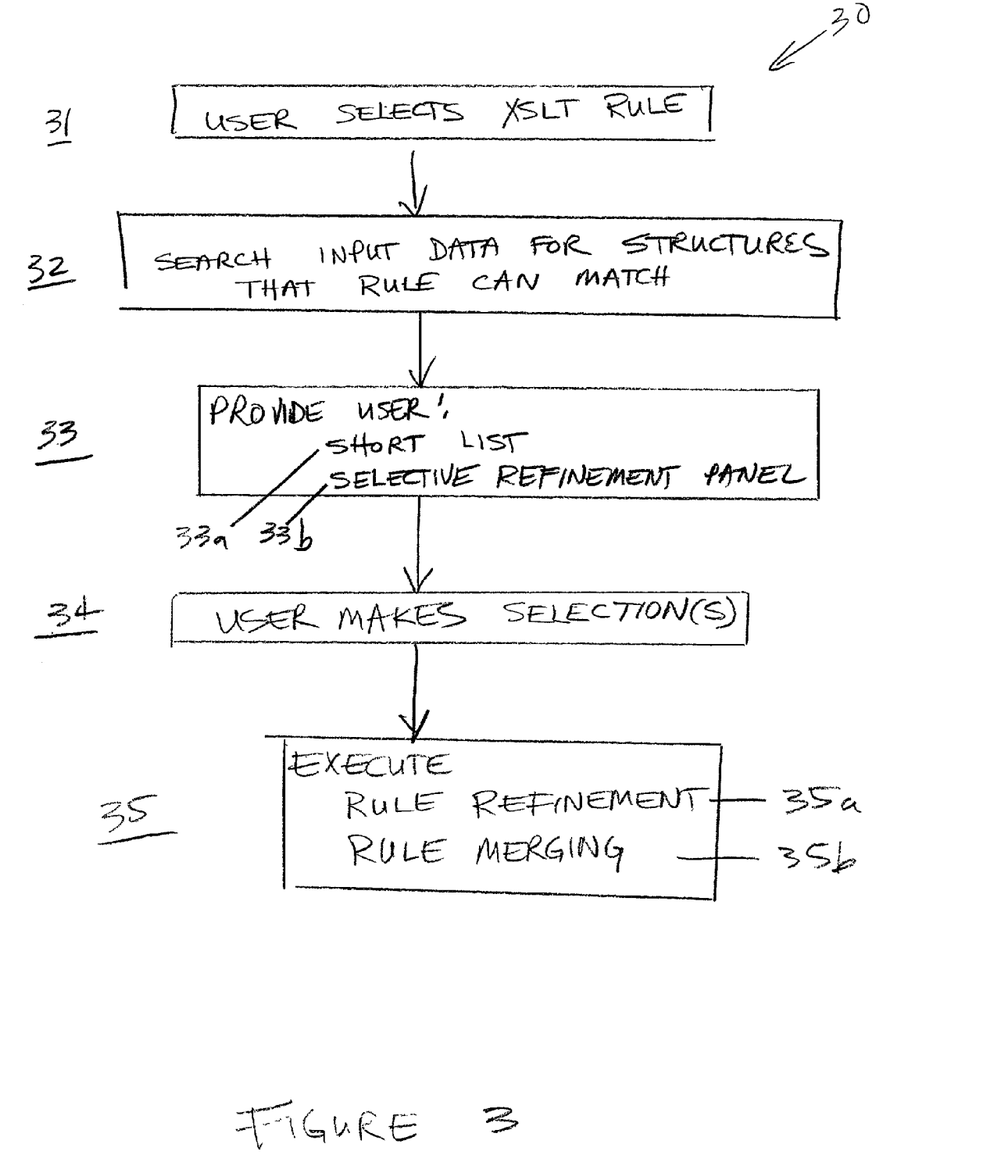

Turning now to FIG. 3, an exemplary method 30 of the present invention is shown in which a user is editing an XSLT stylesheet 10 using the Stylesheet Centric Editor 20 shown in FIG. 2.

In step 31, the user has selected one of the rules contained on the XSL Stylesheet Rules View 24, using a GUI interface such as a mouse click. In step 32, the Stylesheet Centric Editor 20 uses the present invention to search input data 11 for structures that the selected rule can match. In step 33, the user is provided with options including a short list 33a and a selective refinement panel 33b.

Based on selection(s) in step 34 by the user, the present invention executes in step 35 the rule refinement and rule merging process.

Rule Refinement and Cleanup

The present invention assists the user in building new rules quickly and correctly by the process shown in FIG. 3 by using the technique summarized below:

1. Analyzing the used input data for structures that rules can match (step 32).

2. Taking into account any user indication of nodes that should and should not be matched by the new rule (step 34).

3. Ensuring that created rules always match fewer nodes than the rule they are based on (step 35).

4. Ensuring that rules do not do work that would be done anyway if the rule was removed (step 35).

This result is achieved by guaranteeing that rule creation and deletion always involve the appropriate refining and narrowing of existing rule match conditions such that they remain appropriate for the set of input XML sample documents. More specifically, the process is exemplarily broken down into the following sequence.

(i) The following "stepwise" refinement constraints categories of XPath expressions are identified to be used to build up match conditions of step 32:
   (a) constrain the node type to be some particular element or, if that is not possible, constrain it to be any element, root, text, comment, or processing-instruction node,
   (b) constrain the sibling position to a particular integer test (such as for a value from the start/end, odd/even, etc.) with certain algebraic properties detailed below,
   (c) constrain to elements where the value of a particular attribute exists or satisfies a string test (such as for a particular value, with a particular prefix or substring, etc.) with certain algebraic properties detailed below,
   (d) create or refine an existing constraint on the parent,
   (e) create or refine an existing constraint on some ancestor,
   (f) constrain to nodes with a text contents satisfying a particular string test,
   (g) create or refine an existing constraint on the next or some following sibling,
   (h) create or refine an existing constraint on the previous or some preceding sibling, and
   (i) create or refine an existing constraint on some child or descendant.

(ii) Rule Refinement becomes available when there is a selected rule and two selections of input nodes actually processed by that rule and marked as "required" to be processed by the new rule and "forbidden" to it. It searches all possible refinement constraints for cases that "refine" or "narrow" the existing match condition such that the new rule processes the required nodes yet still leave some nodes, at least the forbidden ones, for the old rule. The user can have access to create a new rule with the refined match condition in two ways:
   (a) Immediate access to a "short" list (33*a*) of common refinements that fit the requirements. This has the advantage of offering "one-click rule creation" but is limited in the number of possible refinements that can be presented reasonably.
   (b) Permit the user to open a "selective refinement" panel (33*b*) that permits selection of the possible refinements in each category. This makes it easier to see which refinements it makes sense to combine or chain, is more manageable in cases where a lot of refinements present themselves, and gives users that know their input data well a more direct route to the match conditions they need.

(iii) The individual XSLT rule and choice constructions are refined as follows:
   (a) template (xsl:template) rules are refined by inserting a new template rule with the refined match condition in the match attribute just after the original template,
   (b) choices (xsl:when in xsl:choose) are refined by inserting a new choice (xsl:when) just before the existing one with the refined match condition in the test attribute,
   (c) fall-back choices (xsl:otherwise in xsl:choose) are refined as if they were choices with the "true" match condition in the test attribute,
   (d) conditionals (xsl:if) are refined by first converting them to choices (xsl:choose) with a single choice (xsl:when), and
   (e) other XSLT constructions are refined by refining the containing rule or choice construction.

It is important to ensure that the size of constraints do not explode. In particular each type of constraint that deals with the value of texts and numbers can be limited to one per refinement. This is made possible by restricting such tests to a subset of tests that are closed under union and intersection.

Finally, when a rule is selected from a set of rules with identical effect where it is possible to replace them all with a single rule where the match condition is the union of all their match conditions, then the Cleanup Rule action becomes active, permitting the merging of the selected rule with any combination of the other rules from the set. A special case of this is when one rule is an instance of the other.

The effect of the above is that when the user selects a rule then it is easy to create an appropriate collection of specialized versions of that rule, and the system helps the user to avoid redundant rules.

EXAMPLES

Figure 5:
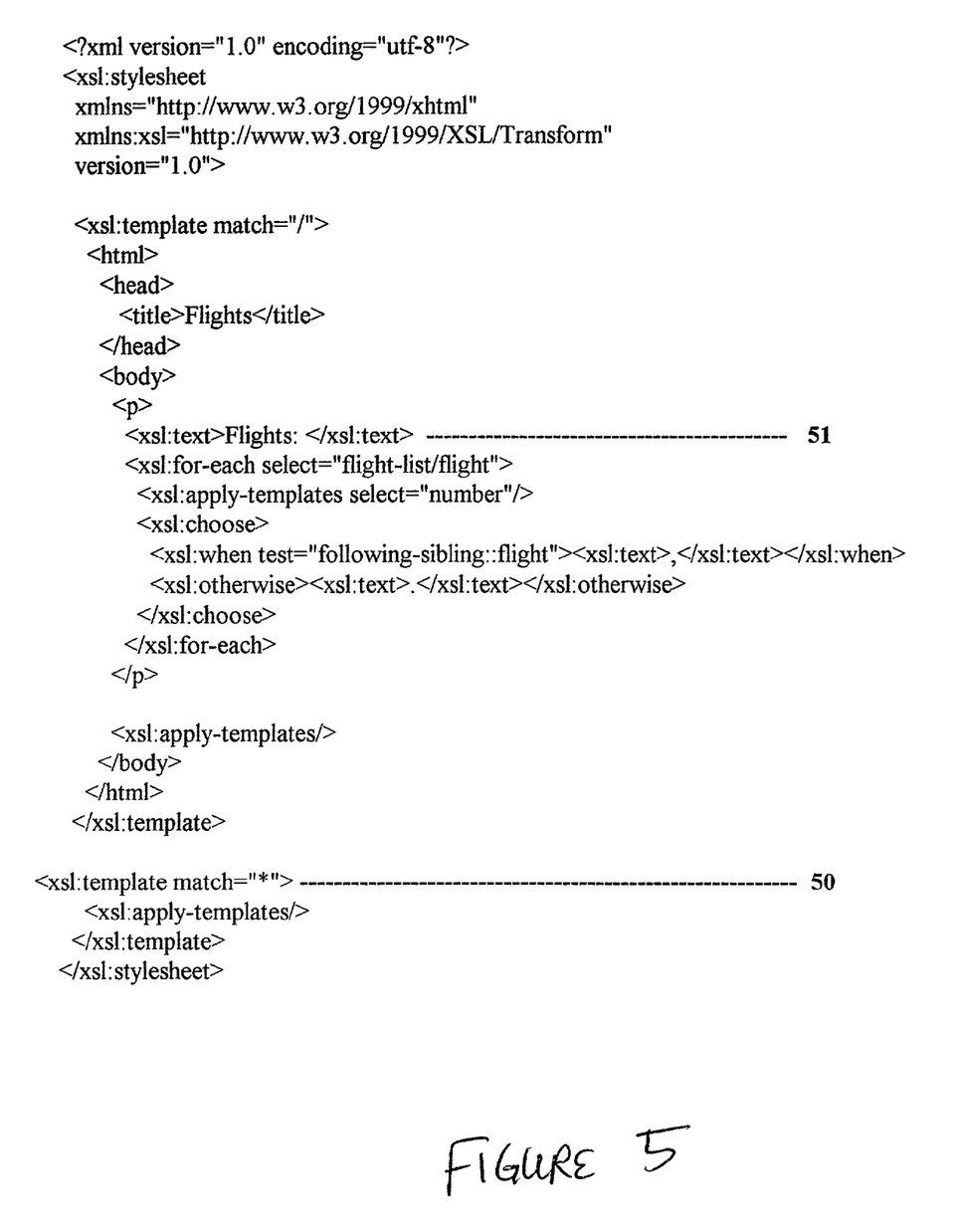

Consider the scenario where the user has one sample input XML document as shown in FIG. 4 and is editing the XSLT stylesheet as shown in FIG. 5. This scenario and the above rules will now be used in some examples.

Example 1

Selecting the first <flight> . . . </flight> node 40 in the sample shown in FIG. 4 and the second "<xsl:template match="*"> . . . " rule 50 in the stylesheet of FIG. 5 enables the Refine Rule action to pop up the following list of possible refinements of the current match condition of "any element":
   flight (category "node type"),
   first flight (category "sibling position"),
   flight with a descendant remark (category "descendant").

Those are the only useful choices and they are found because of the essential principle of (ii) above. That is, they are the only choices that process the selected nodes, namely the first flight node, yet still leave some nodes for the old rule to process, namely, respectively: all non-flight nodes, all but the first flight node, and all but those flight nodes that have a descendant remark node.

The categories indicated are used for stepwise refinement: if the user requests help with refinement then the system can propose that "node type", "sibling position", and "descendant" constraints are appropriate for this choice and, in turn, offer the above refinements.

Selecting one of these three possible refinements will "split" the rule into two, for example selecting the second choice will split the rule into

```
<xsl:template match="*">
    <xsl:apply-templates/>
</xsl:template>
<xsl:template match="flight[1]">
    <xsl:apply-templates/>
</xsl:template>
``` where editing can then progress separately on the original and copied rule.

Note that rule "copying" should be understood in the broadest possible sense. The only thing that is important is that the top-level part, in the example case, the <xsl:template> node, is copied and instantiated with the refined match pattern. The actual contents of the rule can be referenced by sharing or naming so as to avoid excessive copying of large rules.

Refinement now ensures that the user cannot create a stylesheet with the additional redundant rule

```
<xsl:template match="flight[descendant::remark]">
    <xsl:apply-templates/>
</xsl:template>
``` since this condition is only true for the first node that already receives special treatment.

Example 2

Now consider the case where the user selects the third <flight> . . . </flight> node 41 out of the four in the input together with the "<xsl:text>,</xsl:text>"(comma) fragment 51 of the first rule of the stylesheet (matching the root). In that case, the match condition that holds when the comma is output is slightly more involved: it is "flight element with following flight sibling and where the parent is a flight-list element where the parent is the document root"—the XPath is "/flight-list/flight[following-sibling::flight]"—obtained by chaining all the conditions that are known to hold, inside-out. The Refine Rule action becomes available with the following two refinements (with the match condition extension highlighted):

1. "third flight element with following flight sibling and where the parent is a flight-list element where the parent is the document root" (XSLT match pattern "/flight-list/flight[position( )=3 and following-sibling::flight]" and of category "sibling position"), and
2. "flight element with following flight sibling with following flight sibling and where the parent is a flight-list element where the parent is the document root" (XSLT match pattern "/flight-list/flight[following-sibling::flight [following-sibling::flight]]" and of category "following sibling constraints").

Selecting the second refinement changes the choice construction to:

```
<xsl:choose>
    <xsl:when test="following-sibling::flight[following-sibling::flight]"><xsl:text>,</xsl:text></xsl:when>
    <xsl:when test="following-sibling::flight"><xsl:text>,</xsl:text></xsl:when>
    <xsl:otherwise><xsl:text>.</xsl:text></xsl:otherwise>
</xsl:choose>
```

(which makes it possible to change the last "," to the more correct ", and " in the output).

Example 3

Selecting the "<city code="NRT">Tokyo</city>" input node 42 together with the "<xsl:template match="*"> . . . " rule 50 in the stylesheet will have a Refine Rule action with the following list of possible refinements of the current match condition of "any element":

1. city
2. city with text='Tokyo'
3. city with attribute code='NRT'
4. city with parent dep
5. city with an ancestor dep
6. city with an ancestor first leg
7. city with an ancestor last leg Extending the selection to include also the "<city code="PVD">Providence</city>" node (43) reduces the possible refinements to:

1. city
2. city with parent dep
3. city with an ancestor dep
4. city with an ancestor first leg Further extending the selection with the "<time>16:55</time>" node means that one can no longer use the city element node type test so the heuristics (following (rule i.a) above) falls back to the more general "any element" node type test which makes the refinement list longer, namely:

1. any element with a parent dep
2. any element with an ancestor dep
3. any element with an ancestor leg
4. any element with an ancestor leg-list
5. any element with an ancestor flight
6. any element with an ancestor flight-list
7. any element with an ancestor first leg Now constraining the selection to exclude "<number>875</number>" (45) restricts the list again to:

1. any element with a parent dep
2. any element with an ancestor dep
3. any element with an ancestor leg
4. any element with an ancestor leg-list
5. any element with an ancestor first leg Selecting the last choice will split the rule into two:

```
<xsl:template match="*">
    <xsl:apply-templates/>
</xsl:template>
<xsl:template match="leg[1]//*">
    <xsl:apply-templates/>
</xsl:template>
```

Example 4

When the system is in a state like the one just after Example 3 above, namely:

```
<xsl:template match="*">
    <xsl:apply-templates/>
</xsl:template>
<xsl:template match="leg[1]//*">
    <xsl:apply-templates/>
</xsl:template>
```

With either of these rules selected, then the Cleanup Rule action becomes active with the entry.

Merge rule for [any element with an ancestor first leg] into rule for [any element].

Invoking this effectively deletes the second rule from the stylesheet.

Example 5

In case the result of Example 2 above is edited to

```
<xsl:choose>
    <xsl:when
test="following-sibling::flight[following-sibling::flight]"><xsl:text>,
</xsl:text></xsl:when>
    <xsl:when test="following-sibling::flight"><xsl:text>,
</xsl:text></xsl:when>
    <xsl:otherwise><xsl:text>, </xsl:text></xsl:otherwise>
</xsl:choose>
```

(with identical texts) and the first of these is selected, then the Cleanup Rule action is active with the choices.

1. Merge rule for [flight element with following flight sibling with following flight sibling and where the parent is a flight-list element where the parent is the document root] into rule for [flight element with following flight sibling and where the parent is a flight-list element where the parent is the document root].
2. Merge rule for [flight element with following flight sibling with following flight sibling and where the parent is a flight-list element where the parent is the document root] into rule for [flight element where the parent is a flight-list element where the parent is the document root].
3. Merge rule for [flight element with following flight sibling with following flight sibling and where the parent is a flight-list element where the parent is the document root] and rule for [flight element with following flight sibling and where the parent is a flight-list element where the parent is the document root] into rule for [flight element where the parent is a flight-list element where the parent is the document root].

Invoking the last choice replaces the whole rule fragment with the simple <xsl:text>, </xsl:text>.

Exemplary Hardware Implementation

Figures 6, 7:
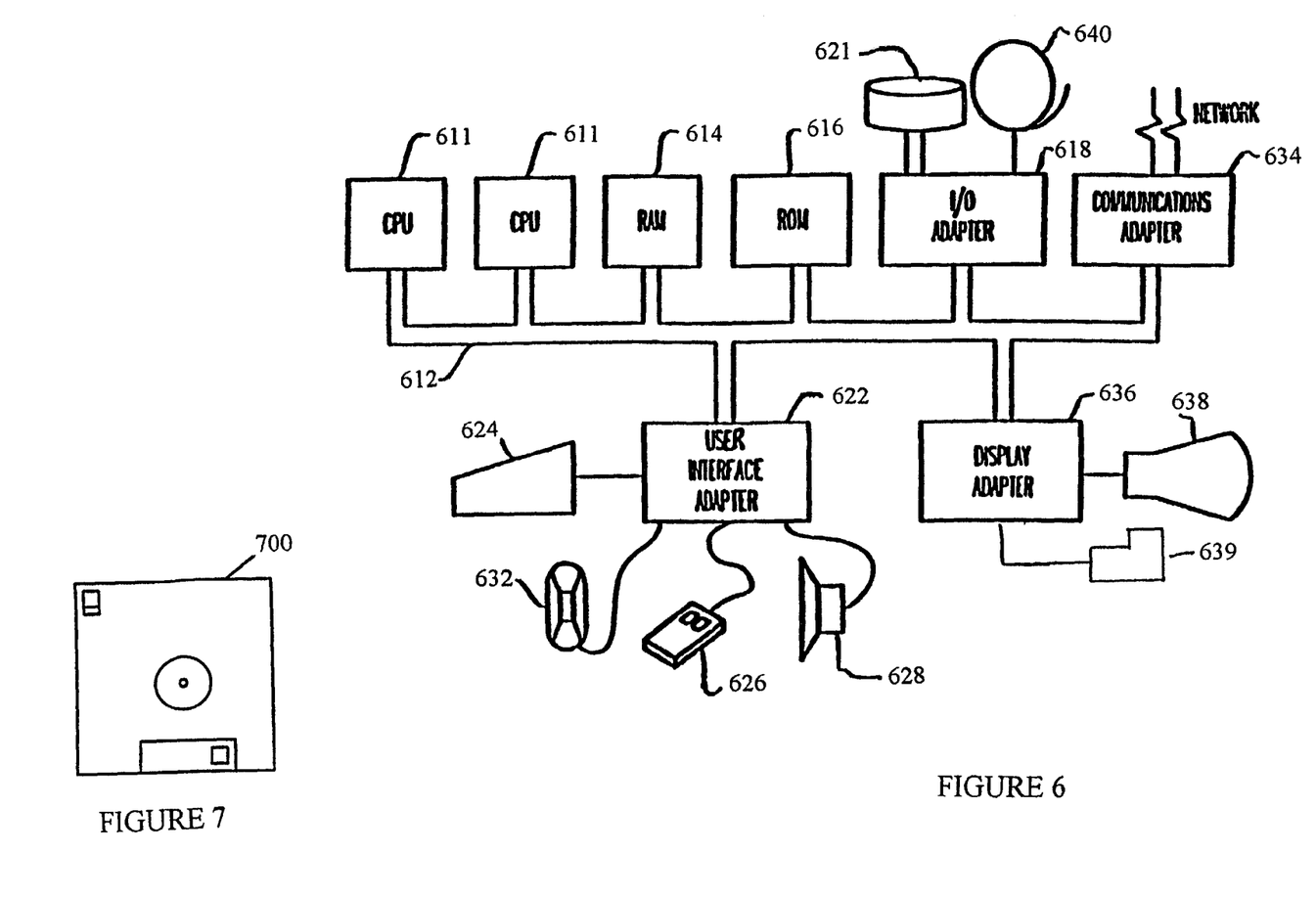

FIG. 6 illustrates a typical hardware configuration of an information handling/computer system for use with the present invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of editing a set of rules contained in a rules document, said rules defining a transformation of data on an input document, said rules document and said input document having elements constructed in a tree structure having nodes, each said rule on said rules document having a template structure including at least one match condition, said match condition being an expression in said template that describes a subset of tree nodes, said method comprising:

selecting at least one rule in said rules document;

checking a match condition of said at least one selected rule with said tree nodes from said input document to determine which structures in said input document match said selected rule;

merging any rules having an identical effect into a single rule; and presenting a listing by computer implementation of proposed rule modifications based on said determination of matching structures, in order to provide said edited set of rules for use in defining transformation of said input document to produce an output document.

2. The method of claim 1, wherein each of said input documents contains tree structured input data, and said method comprises:

selecting nodes in a group of sample input documents; and identifying match conditions of said rules in said rules document with said selected nodes.

3. The method of claim 2, further comprising:

selecting a preferred one of said choice of proposed rule modifications; and modifying said listing of proposed rule modifications based on said user selection.

4. The method of claim 3, wherein said selection includes an indication of nodes required to be processed by the rule being edited.

5. The method of claim 2, wherein said listing of proposed rule modifications comprises at least one of:

a list of common refinement that permit a simple rule creation with minimal inputs; and a selective refinement panel that permits selection of possible refinements in each of a listing of categories.

6. The method of claim 1, wherein said rules document comprises an XSLT (extensible Style Language Transformations) stylesheet and said input document comprises an eXtensible Mark-up Language (XML) source data.

7. A computer comprising:
an editing module programmed to execute a method of editing a set of rules contained in a first document, said rules defining a transformation of data on a second document, said first document and said second document having elements constructed in a tree structure having nodes, each said rule on said first document having a template structure including at least one match condition, said match condition comprising an expression in said template that describes a subset of tree nodes, said editing module comprising:
an input module for receiving a selection of at least one rule in said first document;
a comparator for checking a match condition of said at least one selected rule with said tree nodes from said second document to determine which structures in said second document match said selected rule; and
a display for presenting a listing of proposed rule modifications based on said determination of matched structures, said rule modifications used to provide said edited set of rules, wherein said edited set of rules defines a transformation of said data on said second document to produce a resulting output document having a structure determined exclusively by said edited set of rules, and by the structure of said second document, and wherein any rules having an identical effect are merged into a single rule.

8. The computer of claim 7, wherein said first document comprises an XSLT (eXtensible Style Language Transformations) stylesheet and said second document comprises an eXtensible Mark-up Language (XML) source data.

9. The computer of claim 7, further comprising:
an input module to receive a selection of a preferred one of said choice of proposed rule modifications; and
a rule modification module to modify said listing of proposed rule modifications, based on said selection.

10. The computer of claim 9, wherein said selection includes an indication of nodes required to be processed by the rule being edited.

11. The computer of claim 7, wherein said listing of proposed rule modifications comprises at least one of:
a list of common refinements that permit a simple rule creation with minimal inputs; and
a selective refinement panel that permits selection of possible refinements in each of a listing of categories.

12. A non-transistory machine-readable medium tangibly embodying a program of machine-readable instructions executable by a digital processing apparatus to perform a method of editing a set of rules contained in a first document, said rules defining a transformation of data on a second document, said first document and said second document having elements constructed in a tree structure having nodes, each said rule on said first document having a template structure including at least one match condition, said match condition being an expression in said template that describes a subset of tree nodes, said method comprising:
selecting at least one rule in said first document;
checking a match condition of said at least one selected rule with said tree nodes from said second document to determine which structures in said scone document match said selected rule;
presenting a listing of proposed rule modifications based on said determining of said matched structures in order to provide said edited set of rules, wherein said edited set of rules defines a transformation of said data on said second document to produce a resulting output document having a structure determined exclusively by said edited set of rules, and by the structure of said second document; and
merging any rules having an identical effect into a single rule.

13. The non-transistory machine-readable medium of claim 12, wherein said first document comprises an XSLT (eXtensible Style Language Transformations) stylesheet and said second document comprises an eXtensible Mark-up Language (XML) source data.

14. The non-transistory machine-readable medium of claim 12, said method further comprising:
selecting a preferred one of said proposed rule modifications; and
modifying said listing of proposed rule modifications based on said user selection.

15. The non-transistory machine-readable medium of claim 14, wherein said selection includes an indication of nodes required to be processed by the rule being edited.

16. The non-transistory machine-readable medium of claim 12, wherein said listing of proposed rule modifications comprises at least one of:
a list of common refinements that permit a simple rule creation with minimal inputs; and
a selective refinement panel that permits selection of possible refinements in each of a listing of categories.

* * * * *